United States Patent [19]

Greller

[11] Patent Number: 4,950,352
[45] Date of Patent: Aug. 21, 1990

[54] HOT AIR HEATER FOR WELDING PLASTIC MATERIALS TOGETHER AND METHOD OF HANDLING THE HOT AIR FLOW

[75] Inventor: Peter Greller, Enkenbach, Fed. Rep. of Germany

[73] Assignee: Pfaff Industriemaschinen GmbH, Kaiserslautern, Fed. Rep. of Germany

[21] Appl. No.: 254,450

[22] Filed: Oct. 6, 1988

[30] Foreign Application Priority Data

Oct. 9, 1987 [DE] Fed. Rep. of Germany ....... 3734137

[51] Int. Cl.$^5$ .......................... B05B 1/34; B29C 65/10
[52] U.S. Cl. ..................................... 156/497; 156/499; 156/555; 239/499; 239/587; 239/594; 239/597
[58] Field of Search ............... 156/497, 499, 544, 555; 239/103, 485, 487, 499, 506, 587, 594, 597, 592

[56] References Cited

U.S. PATENT DOCUMENTS

| | | | |
|---|---|---|---|
| 1,676,564 | 7/1928 | Lausen | 239/587 |
| 1,923,425 | 8/1933 | Diederich | 239/587 |
| 3,562,920 | 2/1971 | Vuilleumier et al. | 156/497 |
| 3,878,991 | 4/1975 | Sabadics et al. | 239/597 |
| 4,037,667 | 7/1977 | Gonsalves et al. | 239/594 |

Primary Examiner—Michael Wityshyn
Attorney, Agent, or Firm—McGlew & Tuttle

[57] ABSTRACT

An air guiding arrangement for welding materials having plastic films includes a device to supply a uniform hot-air stream at any given air velocity. The air guiding arrangement has a nozzle which contains a swirl chamber functioning as a diffuser which tapers in the shape of a funnel. The nozzle is preceded by an adjustable air divider through which the amount of air to be supplied to the welding site is varied. The hot-air welding machine serves for a seam-shaped connection of plastic containing materials providing uniform heat distribution in the welding gap. In accordance with the inventive method, air is generated in a hot-air generator and delivered through an air divider in which only the quantity of air necessary for correct heating of a plastic material is permitted to flow further to a nozzle and wherein in the nozzle the air is directed through a plurality of radial openings through a swirl chamber which converges to an opening which is of a much larger area than all of the openings so that the hot air is permitted to swirl in the chamber between the sets of openings in which the air is guided so that it can be directed more precisely onto the welding materials and the air may be concentrated as desired over a welding strip.

9 Claims, 1 Drawing Sheet

HOT AIR HEATER FOR WELDING PLASTIC MATERIALS TOGETHER AND METHOD OF HANDLING THE HOT AIR FLOW

BACKGROUND OF THE INVENTION

1. Field of the Invention

This invention relates, in general, to welding machines and, particularly to machines of this nature which have means for welding materials having plastic films therein including a guide for the heated air so that the air may be directed against the materials to be welded to accomplish a desired heating.

From German utility model No. 75 19 431, an air guiding arrangement for hot-air welding equipment is known for which different models of hot-air nozzles formed as 90° arcs are provided. To achieve uniform hot air conduction when producing welding seams of more than 5 mm width the nozzles have at least two guide fins extending in the direction of through-flow. Apart from the fact that the fabrication of such nozzles is rather costly due to the different distances of the fins from the center of curvature, and the thereby caused different curvature, a further disadvantage is that for different air flow velocities correspondingly adapted nozzles are required.

SUMMARY OF THE INVENTION

The invention provides a hot-air welding machine whose air guiding arrangement supplies a uniform hot-air stream, and it is simple to fabricate, and can be used for any given air flow velocity.

Due to the measure of designing the area of cross section of the outlet openings of the swirl chamber very much larger than the combined areas of the inlet openings, the swirl chamber functions as a diffuser. The arrangement provides that the individual air jets, emerging from the radial apertures under increasing pressure and a simultaneous decrease of the flow velocity, expand and in the process are swirled and mixed with each other to form a very uniform relatively slower air stream. Since the outlet opening exactly opposes the inlet openings and, hence, no deflection of the air current takes place within the swirl chamber, the heated air emerges from the nozzle as a uniformly directed homogeneous stream by which punctiform overheating at the welding site is avoided.

Since, due to the diffusor function of the swirl chamber, the air jets entering the swirl chamber are swirled and mixed at low as well as at high inflow velocities and no further current deflection takes place, a uniform air current leaves the nozzle at all times even with different air flow velocities.

If the area of cross section of the outlet opening is several times greater than the sum of the areas of cross section of the inlet openings, the swirl chamber will taper in a funnelshape in the direction of the outlet opening. It follows, that the swirl chamber forms, in the region of the inlet opening, a correspondingly greater hollow space than in the region of the outlet opening. In this case, the air jets emerging from the radial apertures are expanded to a greater extent in the inlet region of the swirl chamber whereby the diffusor effect of the swirl chamber is further reinforced.

Through the funnel shape of the swirl chamber, the additional important advantage is attained that the swirling air stream, before flowing out, is bundled which permits it to be directed more precisely onto the welding gap which narrows in a wedge shape.

Through the use of lateral guide tabs, premature lateral spread of the air steam directed into the welding gap is prevented. In this way, a further contribution is made to the fact that the material to be welded is uniformly heated over the entire width of the welding seam to be formed.

Since, from the nozzle according to the invention, even at different air velocities, a uniform air stream emerges, an air guiding arrangement can be provided with an adjustable air divider through which the quantity of air to be supplied to the welding site can be adjusted precisely depending on the particular heat requirement.

Advantageous further constructional developments of the air divider are provided by the arrangement of the invention. For example, the funnel-shaped widening of the screw sleeve advantageously functions as sound insulation of the partial air steam emerging from the aperture.

Accordingly, it is an object of the invention to provide an air guide from a hot air supply or generator to material strips which are being welded and which includes a nozzle construction in the connection wherein the air is directed through radial openings into a swirl chamber which has a divergent air passage which has an opening with an area that is larger than the openings through which the air is passed.

A further object of the invention is to provide a hot air guide, particularly for welding materials having plastic therein, which includes means for dividing part of a hot air received from a hot air supply and passing the selected amount of air through a nozzle having means for swirling the air in a stream which may be uniformly directed against the materials being welded.

A further object of the invention is to provide a welding device, particularly for joining strip material together which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
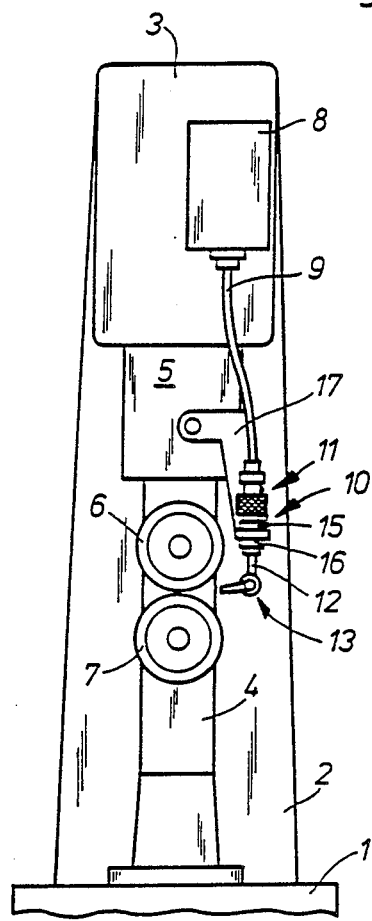
FIG. 1 is a side elevational view of a welding machine with the air guiding arrangement.
Figure 2:
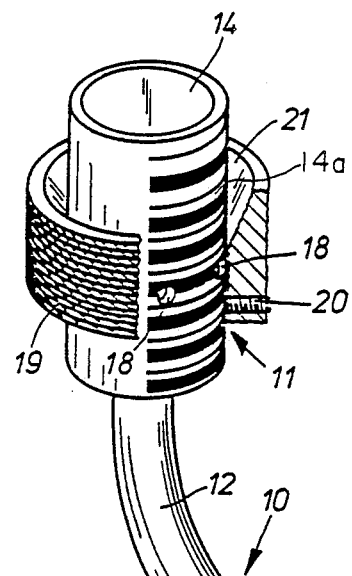
FIG. 2 is a perspective view partly broken away of the air guiding arrangement.

Referring to the drawings, in particular, the invention embodied therein includes a base plate 1 carrying upper and lower pressure rolls 6 and 7 between which materials to be welded are passed. In accordance with the invention, hot air is generated in a hot air generator 8 and delivered through a hose 9 for air guide duct 10 which has one duct end connected to the hot air supply 8 and an opposite duct end which is connected through an air divider 11 and a screw connection 22 to a nozzle 13. In accordance with a feature of the invention, a nozzle 13 which is connected to the opposite end of the duct has a tubular portion with a wall having a plurality of spaced-apart nozzle inlet openings 25. The nozzle 13 also includes a swirl chamber portion which is connected to the tubular portion forming a cylindrical ante-chamber 23. One end of the swirl chamber portion is connected onto the cylindrical ante-chamber portion 23 and surrounds the openings 25. The swirl chamber opposite end has an opening 31 which is opposed to the openings 25 and is of a greater area than the nozzle inlet openings 25.

The casing or housing of the welding machine is C-shaped and includes the base plate 1, a base 2 and an arm having a head 3. On the base plate 1, a vertical column 4 is arranged.

On a carrier 5 fastened on head 3 an upper pressure roll 6, acted upon by a spring in the vertical direction, is arranged which cooperates with a lower pressure roll 7 arranged on column 4. Both pressure rolls 6 and 7 can be driven synchronously with other known (not further shown) driving arrangements.

On the head 3, a known and therefore only symbolically indicated hot-air generator 8 is fastened via hose or duct 9 with an air guiding arrangement 10. The air guiding arrangement or assembly 10 includes an air divider 11, a bent tubular piece 12 and a nozzle 13.

The air divider 11 has a cylinder defining a chamber 14 provided with external threads 14a which is clamped with two ring nuts 15 and 16 on a bent holding piece 17 which, in turn, is arranged on the carrier 5. In the peripheral wall of cylinder chamber 14 several radial apertures 18 are provided. On the cylinder chamber 14 a threaded nut or screw sleeve 19 is arranged, the relative position of which can be secured by a locking screw 20. The upper part of the screw sleeve 19 widens in the shape of a funnel whereby between the screw sleeve 19 and the peripheral face of the cylinder chamber 14 a wedge-shaped annular gap 21 is formed.

One end of the tubular piece 12 is firmly connected with the cylinder chamber 14. At the other end of the tubular piece 12 the nozzle 13 is connected with the screw connection 22.

The nozzle 13 has a cylindrical ante-chamber 23 which forms more or less an extension of the tubular piece 12. In the wall of the ante-chamber 23 several radial apertures 24 arranged next to each other are provided which form the inlet openings 25 for a swirl chamber 26 arranged on the peripheral face of the ante-chamber 23. The swirl chamber 26 includes an upper plate 27, a lower plate 28, and two side parts 29 and 30, these parts being hard soldered to each other. Due to this structure of the swirl chamber 26, a flat rectangular outlet opening 31 is formed which directly opposes the inlet openings 25. The area of cross section of the outlet opening 31 is several times greater than the sum of the areas of cross section of the inlet openings 25. The swirl chamber 26 tapers in the shape of a funnel in the horizontal as well as also in the vertical plane in the direction toward the outlet opening 31. The side parts 29 and 30 project to a slight extent beyond the front end of the upper plate 27 and the lower plate 28 whereby they form lateral guide tabs 32 and 33 for the air streaming from the outlet opening 31.

By tapering the end of the ante-chamber 23 and through the use of different diameters of the apertures 24, where necessary, it can be accomplished that the air jets penetrating the apertures 24 are substantially of identical size and have identical flow velocities.

Figure 3:
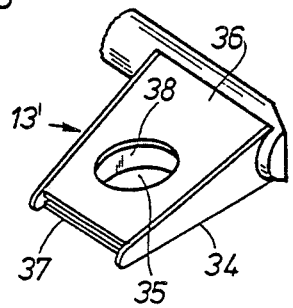
FIG. 3 is a partial perspective view of a nozzle provided with a test bore.

In the variant shown in FIG. 3, the nozzle 13' has a swirl chamber part 34 in which a testing or viewing bore 35 penetrating vertically is provided through which the operator can check the relative position of the material to be welded before welding it and, if necessary, correct it. The testing bore 35 is bounded by a cylindrical ring 38 soldered air-tight to the upper plate 36 and the lower plate 37 which prevents hot air from leaving through the testing bore 35.

Before the welding machine is operated the adjustment level of the screw sleeve 19 is checked and possibly changed so that the continuous air stream supplied by the hot-air generator 8 enters the tubular piece 12 only to the extent required at the welding site for heating the material to be welded. The part of the air stream supplied by the hot-air generator 8 not needed penetrates through the apertures 18 into the annular gap 21, flows upward, and mixes with the ambient air.

The air stream entering tube 12 from the cylinder chamber 14 flows into the ante-chamber 23 and, subsequently, enters the swirl chamber 26 through apertures 24 in the form of a multiplicity of thin air jets. Since the swirl chamber 26 due to the large differences of the area of cross section of the outlet opening 31 and the combined areas of the inlet openings 25 functions as a diffusor, the individual air jets expand while the flow velocity is simultaneously decreased and the streams are swirled and mixed with each other so that an air stream of uniform width and flowing comparatively slower emerges which very uniformly heats the material to be welded at the welding site.

Due to the funnel shape of the swirl chamber 26, the air stream is bundled before flowing out of the outlet opening 31 which permits that it can be directed more precisely onto the welding site which narrows in the form of a wedge. The lateral guide tabs 32 and 33 prevent premature lateral spread of the air stream. This contributes to the fact that the material to be welded is heated uniformly over the entire width of the welding seam to be formed.

Similarly to the swirl chamber device 26, the air entering swirl chamber device 34 is swirled, flows around ring 38 of the test bore 35, combines behind ring 38, and emerges also as a uniform air stream from the swirl chamber 34.

While specific embodiments of the invention have been shown and described in detail to illustrate the application of the principles of the invention, it will be understood that the invention may be embodied otherwise without departing from such principles.

What is claimed is:

1. A hot air welding machine for connection of plastic materials, comprising a hot air supply, a duct extending out of said hot air supply, a nozzle connected to said duct, said nozzle having an ante-chamber portion aligned with and connected to said duct, said ante-chamber portion having a plurality of axially spaced radial apertures defining nozzle inlet openings, a swirl chamber member having one end connected to said antechamber portion and surrounding the openings and having an opposite end with a swirl chamber outlet opening having an area several times larger than the sum of the areas of said nozzle inlet openings.

2. A hot air welding machine according to claim 1, wherein said swirl chamber member includes upper and lower plates positioned tapering inwardly and away from said ante-chamber portion toward said swirl chamber outlet opening.

3. A hot air guide for delivering heating air to effect welding of plastic materials, comprising a heating air supply, an air guide duct having one duct end connected to said heating air supply and having an opposite duct end, a nozzle connected to said opposite duct end having a tubular portion with a wall with a plurality of spaced-apart nozzle inlet openings, a swirl chamber portion having one end connected to said tubular portion and surrounding said openings, and said swirl chamber portion having an opposite end with an outlet opening therein, said outlet opening of said swirl chamber portion being of greater area than the sum of the areas of said nozzle inlet openings.

4. A hot air guide according to claim 3, including air dividing means in said air guide duct for dividing off a selected amount of air from the flow through said duct.

5. A hot air guide according to claim 4, wherein said air dividing means comprising a cylindrical member in said duct having a threaded exterior wall with a plurality of circumferentially spaced openings therein, a nut member threaded to said cylindrical member and having a portion which is threaded and is positionable to overlie a selected portion of said plurality of circumferentially spaced openings, said nut member having an annular gap portion which is spaced away from said cylindrical member providing a discharge flow for a portion of the air through the openings of said cylindrical member.

6. A hot air guide according to claim 3, including a testing bore extending through said swirl chamber portion and having a tubular wall defining a viewing opening through said swirl chamber portion.

7. A hot air guide according to claim 3, including an air divider connected in said duct before said nozzle for limiting the amount of air to be supplied into said swirl chamber portion.

8. A hot air guide according to claim 7, wherein said air divider includes a cylindrical member having a plurality of radial apertures therein and a screw sleeve engaged over said cylindrical member and being displaceable axially therealong for covering a selected portion of said plurality of radial apertures.

9. A hot air guide according to claim 8, wherein said cylindrical member is threaded on its exterior and said screw sleeve comprises a threaded nut threadably engaged on said cylindrical member and having an outwardly divergent portion adjacent one end of said nut defining a passage for the flow of heated air from a non-covered portion of said plurality of radial apertures to the atmosphere.

* * * * *